United States Patent Office 3,074,940
Patented Jan. 22, 1963

3,074,940
PROCESS FOR THE MANUFACTURE
OF ENAMINES
Erhard P. Benzing, Zurich, Switzerland, assignor to Monsanto Chemical Company, St. Louis, Mo., a corporation of Delaware
No Drawing. Filed Sept. 2, 1959, Ser. No. 837,578
Claims priority, application Switzerland Sept. 10, 1958
5 Claims. (Cl. 260—247)

This invention relates to the production of enamines. It is particularly concerned with a simple and efficient procedure for the preparation of N-disubstituted alkenyl amines, especially isobutenylamines and 2-ethylbutenylamines.

The existing methods for the preparation of enamines from aldehydes and secondary amines are based on the removal of the reaction water with drying agents like anhydrous sodium carbonate, potassium carbonate, calcium oxide, calcium sulfate or borax (C. Mannich and H. Davidsen, Ber., 69, 2106 (1936); H. Hopff and R. Furter to J. R. Geigy A. G., Basel, German patent appln. No. 1,057,101 (1959)). Two moles of a secondary amine must be used per mole of aldehyde to form alkylidenebisamines from which enamines are obtained on distillation. The yields are generally poor, particularly with aromatic amines and the separation of enamine from excess amine is sometimes difficult. Another procedure gives enamines derived from ketones by removing the reaction water in an azeotrope with added benzene (F. W. Heyl and M. E. Herr, J. Am. Chem. Soc., 74, 3627 (1952); 75, 1918 (1953); G. Stork et al., J. Am. Chem. Soc., 76, 2029 (1954); E. P. Benzing et al., Ber., 90, 2833 (1957)). This method cannot be applied to the condensation of aromatic amines with aldehydes having a boiling point lower than benzene (80.1°).

It is an object of the invention to produce enamines in a single one-step operation which gives good yields even with aromatic and heterocyclic amines where the previous methods fail almost entirely. The yield of, for example, isobutenylmorpholine is 94% compared with 29% in Mannich's procedure (P. L. De Benneville and J. H. McCartney, J. Am. Chem. Soc. 72, 3037 (1950)).

These and other objects of the invention will become apparent as the detailed description of the invention proceeds.

The invention is based on my discovery that certain aldehydes form azeotropes with water which can be used to remove the reaction water formed in their condensation with secondary amines.

The aldehydes which can suitably be employed in the present process are branched at an alpha-carbon atom and correspond to the formula $R_1R_2CH$—$CHO$ wherein $R_1$ and $R_2$ are hydrocarbon radicals, particularly alkyl radicals having not more than about 3 carbon atoms. Especially suitable are isobutyraldehyde and 2-ethylbutyraldehyde. The secondary alpha-carbon atom of these aldehydes prevents aldole condensation and formation of mixtures of higher unsaturated amines.

The amines which can be condensed with the aldehydes are secondary amines containing not more than one 5- or 6-membered ring system directly attached to the nitrogen atom of the amine and having a boiling point at least as high as the azeotropic mixture which is formed with the aldehyde employed and the reaction water, particularly the aliphatic, cycloaliphatic, araliphatic and aromatic hydrocarbon and heterocyclic secondary amines fitting this definition and having not more than about 22 carbon atoms. In the absence of a commonly used abbreviation such as araliphatic, cycloaliphatic and heterocyclic are defined to include cycloaliphatic and heterocyclic amines wherein the amine radicals are attached either directly to ring carbon atoms, form a part of a heterocyclic ring or are attached directly to aliphatic radicals which are attached to cycloaliphatic or heterocyclic ring atoms. The aromatic or heterocyclic radicals can be multiple rings either fused or non-fused; however, generally the monocyclic radicals will be preferred.

Since the boiling point of, for example, the binary azeotrope of isobutyraldehyde and water (B.P. 61°) is higher than the boiling point of, for example, dimethylamine (B.P. 7.4°) or diethylamine (B.P. 55.5°), these amines are not suitable for the process of the invention, while, for example, morpholine (B.P. 126–130°) gives readily the corresponding isobutenylamine or 2-ethylbutenylamine by the method of this invention.

Dicyclohexylamine, for example, cannot be reacted with the aldehydes, because steric hindrance occurs. This would be expected with all secondary amines which have two 5- or 6-membered ring systems directly attached to the nitrogen atom of the amine.

Further illustrative examples of secondary amines which can be used successfully to carry into effect the present invention are ethyl-propylamine, di-n-propylamine, di-iso-butylamine, di-octylamine etc.; N,N'-methyl-ethylenediamine, N,N'-ethyl-p-phenylenediamine, N,N'-methyl-ethylenediamine, N,N'-ethyl-propylenediamine, N,N'-ethyl-hexamethylenediamine etc.; di-allylamine etc.; methyl-benzylamine, di-benzylamine etc.; methylaniline, octylaniline, ethyl-p-tolylamine, propyl-3,4-xylylamine, methyl-p-biphenylamine, etc.; methyl-cyclohexylamine, stearyl-cyclohexylamine etc.; N,N',N''-methylguanidine, N,N', N''-phenylguanidine etc.; N,N',N''-methylmelamine, N, N',N''-phenylmelamine etc.; pyrrolidine, piperidine, piperazine, indole, etc.

A generally preferred method of carrying out the present process comprises refluxing a mixture of the secondary amine and the aldehyde, continuously removing the reaction water in an azeotrope with an excess of aldehyde and eventually recovering by distillation under reduced pressure or by other customary methods the thus-formed enamine. The condensation is preferably carried out under atmospheric pressures, but subatmospheric pressures can be advantageous if high boiling aldehydes are used and it is conceivable that pressure operation will be desirable in some instances. To prevent polymerization of certain enamines (e.g. isobutenyl-diallylamine), little amounts (0.1–1%) of a stabilizing agent like hydroquinone or phenyl-beta-naphthylamine may be added to the reaction mixture.

The enamines obtained by condensation of an aldehyde with a secondary mono-amine have the formula $R_1R_2C=CH$—$NRR'$ and those obtained with a secondary di-amine $R_1R_2C=CH$—$NRR'N$—$CH=CR_2R_2$ in which $R_1$ and $R_2$ are hydrocarbon radicals and the groups —NRR' and —NRR'N— are derived from the secondary amine employed of which examples are enumerated above.

The enamines are stabilizing and acid binding agents. They can be reduced to the corresponding saturated amines.

EXAMPLE 1

43.6 ml. of morpholine (0.5 mole) and 46 ml. of isobutyraldehyde (0.5 mole) were mixed, eventually under cooling. An excess of isobutyraldehyde corresponding to the volume of the water-separator employed (in this case a Dean Stark apparatus with 35 ml. volume) was added and the mixture refluxed for 3 hours. All temperatures used throughout this application are in degrees centigrade.

9 ml. of reaction water were separated from the refluxing aldehyde azeotrope. Then, the aldehyde was distilled off and the remainder fractionally distilled over a 30 cm. Vigreux column.

In analogous procedure other enamines were obtained and their process data, yields and physical constants are listed in the table below.

Table

| No. | Enamine | hr. | yield, percent | Boiling point | $n_D^{20}$ | Analysis, Percent N | | Equivalent Weight [1] | | |
|---|---|---|---|---|---|---|---|---|---|---|
| | | | | | | calc. | found | calc. | found (NH) | found (CO) |
| 1 | Isobutenylmorpholine | 3 | 94 | 56–57°/11 mm | 1.4670 | 10.06 | 9.92 | 141.2 | 138.5 | 139.5 |
| 2 | Isobutenylpiperidine | 2½ | 94 | 52°/14 mm | 1.4679 | 9.88 | 10.06 | 139.2 | 140.0 | 144.3 |
| 3 | Bis(isobutenyl)piperazine | 5 | 89 | 66–67°/1 mm (M.P. 35–37°) | | 14.44 | 14.42 | 97.1 | 99.4 | 130.0 |
| 4 | Isobutenylpyrrolidine | 6 | 89 | 46°/11 mm | 1.4740 | | | 125.2 | 127.1 | 129.2 |
| 5 | Isobutenylmethylcyclohexylamine | 5 | 76 | 96°/19 mm | 1.4740 | | | 167.2 | 168.0 | 174.0 |
| 6 | Isobutenylmethylaniline | 10½ | 87 | 50–53°/0.1 mm | 1.5578 | 8.69 | [2] 8.58 | | | |
| 7 | Isobutenyldiallylamine | 6 | 32 | 51.5–52.5°/9 mm | 1.4564 | | | | | |
| 8 | Ethylbutenylmorpholine | 2½ | 86 | 63°/5 mm | 1.4675 | | | 160.3 | 171.0 | 170.0 |

[1] Titration of amine (NH) and carbonyl (CO) after hydrolysis.
[2] C: calc. 81.93, found 81.74; H: calc. 9.38, found 9.45.

In Example 8 above, the reaction was carried out in the presence of a catalytic amount of p-toluenesulfonic acid.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, aliphatic, cycloaliphatic, aromatic and araliphatic hydrocarbon amines and hydrocarbon aldehydes are indicated particularly. Of the named heterocycles only oxygen and nitrogen containing nuclei are described, but of course, sulfur or selenium as well as oxygen containing heterocyclic rings are common and can be used; however, it is not intended to exclude the less common phosphorus, arsenic, antimony, etc., heterocycles. The term "hydrocarbon" in conjunction with these radicals, however, is used throughout this patent application in its broader sense, in that a particular hydrocarbon or heterocyclic radical can also contain constituents other than carbon and hydrogen and in the case of the heterocycles other than the heterocyclic atoms, such as alkoxy, nitro, etc., provided these constituents are either nonreactive or at least do not interfere with the formation of the enamines in the process of the invention. One skilled in the art will recognize that a compound containing a hydrocarbon radical or heterocyclic radical that is substituted with a non-interfering constituent group is the equivalent of the corresponding compound containing a hydrocarbon radical or heterocyclic radical containing only carbon and hydrogen. Such non-interfering groups can be present initially in a compound subjected to the process of the invention and can, depending on the circumstances, either be retained in the product molecule or be destroyed or changed during the reaction; or such group can be introduced by known means into the enamines produced by the process of the invention after the formation of the enamine. Accordingly, modifications are contemplated which can be made without departing from the spirit of the described invention.

What is claimed is:

1. In a process for preparing enamines comprising refluxing a mixture of an aldehyde capable of forming an azeotrope with water and having the formula $$R_1R_2CH-CHO$$

wherein $R_1$ and $R_2$ are hydrocarbon radicals, and a secondary amine having not more than one 5- to 6-membered ring system with a ring attached directly to the nitrogen atom of the amine and having a boiling point at least as high as the boiling point of said azeotrope, the improvement wherein said aldehyde is present in said mixture in excess of 1:1 molar ratio to said amine and the reaction water is continuously distilled from the reaction mixture as a water-aldehyde azeotrope.

2. In a process for preparing isobutenylmorpholine comprising refluxing a mixture of isobutyraldehyde and morpholine, the improvement wherein said aldehyde is present in said mixture in excess of 1:1 molar ratio to said amine and the reaction water is continuously distilled from the reaction mixture as a water-aldehyde azetrope.

3. The process of claim 1 wherein said amine is selected from the group consisting of di-allylamine, methylcyclohexylamine, methyl-aniline, piperdine, pyrrolidine, piperazine and morpholine.

4. The process of claim 1 wherein the product enamine is recovered from the reaction mixture by distillation.

5. The process of claim 4 wherein said aldehyde is selected from the group consisting of isobutyraldehyde and 2-ethylbutyraldehyde, and said amine is selected from the group consisting of di-allylamine, methyl-cyclohexylamine, methyl-aniline, piperidine, pyrrolidine, piperazine and morpholine.

References Cited in the file of this patent

UNITED STATES PATENTS

| | | |
|---|---|---|
| 2,220,065 | Clarkson | Nov. 5, 1940 |
| 2,307,455 | Ehrlich | Jan. 5, 1943 |
| 2,578,787 | De Benneville | Dec. 18, 1951 |